July 8, 1958          S. MEURER          2,842,106

COLD ENGINE STARTING DEVICE

Filed July 15, 1957

INVENTOR

Siegfried Meurer

BY

Bailey, Stephens & Huettig

ATTORNEYS

United States Patent Office 2,842,106
Patented July 8, 1958

2,842,106

COLD ENGINE STARTING DEVICE

Siegfried Meurer, Nurnberg, Germany, assignor to Maschinenfabrik Augsburg-Nürnberg A. G., Nurnberg, Germany Application July 15, 1957, Serial No. 671,859

Claims priority, application Germany July 24, 1956

4 Claims. (Cl. 123—30)

This invention relates to a device for the cold starting of internal combustion engines. In particular, the invention is directed to an internal combustion engine in which the fuel is injected in the form of one or more solid jets against the wall of the combustion chamber. Moreover, the invention is especially directed to engines in which the major portion of the fuel is deposited on the wall of the combustion chamber by a solid jet having a short path tangentially of the wall in order to form a fuel film over a large wall surface and with an air swirl directed so as to release and mix the vaporized fuel with the air and burn it. Engines of this type are those disclosed in German Patent No. 865,683 and my copending application Serial No. 480,432, filed January 7, 1955, for "Operation of Internal Combustion Engines."

The object of this invention is to produce a simple device for the cold starting of internal combustion engines, particularly of the self-ignition type.

Internal combustion engines, especially diesel engines, start more easily when cold if the injected fuel is mixed with the highly compressed and swirling air in the combustion chamber in order to produce a fine atomization of the fuel. To accomplish this in engines having the fuel injected tangentially to the air swirl in the combustion chamber, it has been suggested to provide a secondary fuel jet for starting purposes, this jet is divergently directed from the main tangential fuel jet and toward the center of the combustion chamber or opposed to the air swirl direction.

Similar means have been suggested also for starting engines as described above in which the major portion of the fuel is deposited on the combustion chamber wall. In these engines the best possible mixing of the fuel and air in a suspension state during starting and cold starting, respectively, is of the most importance because normally the vaporization takes place from a relatively cold combustion chamber wall, rather than from a pre-heated or hot combustion chamber wall, as, for example, in a hot bulb engine. Thus, during cold starting, the vaporization from a cold wall cannot be obtained rapidly enough. Consequently, the difficulty in the starting of the engine should be favorably overcome by means of a better mixing of the liquid fuel in atomised form with the air. The up-to-now used means for obtaining the air-fuel mixing, as, for example, by turning the injection nozzle or using masks fitted rotatably to the intake valves, are disadvantageous in that they are not fully automatic in operation but require a control outside of the engine cylinders. If these controls are to be made automatic, further auxiliary equipment would be necessary and result in a complicated and expensive construction.

The objects of this invention are obtained by a simple device. This is composed of a temperature sensitive and movable deflecting device within the range of the path of the fuel jet. At low temperature, this deflecting device obstructs the path of the fuel jet and deflects the fuel to an area in the combustion chamber occupied by the highly compressed swirling air. As the temperature increases, this deflecting device will move away from the fuel path so that the fuel will then impinge upon the wall of the combustion chamber. This deflecting device can be composed of a compound or bi-metal strip mounted on the wall of the combustion chamber. At low cold starting temperature, this strip is bent toward the interior of the combustion chamber and across the path of the fuel jet; and when the engine is hot, the strip will bend away from the path of the fuel jet and be positioned adjacent to the combustion chamber wall. In order to obtain the same effect, the bi-metal strip can be mounted on the injection nozzle. This bi-metal deflecting baffle strip constitutes an automatic deflecting device, which at low temperature keeps the fuel from contacting the combustion chamber wall, and produces an atomization of the fuel with the air. As soon as the engine reaches its higher running temperature, the baffle strip automatically bends into a position in which it lies against the combustion chamber wall and out of the path of the fuel jet.

The means by which the objects of the invention are obtained are disclosed more fully with reference to the accompanying drawings in which.

Figure 1:
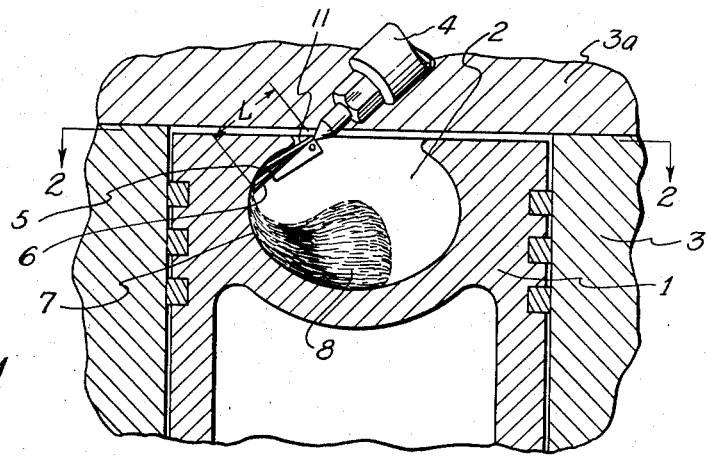
Figure 1 is a cross-sectional view through the cylinder of a fuel injection engine.
Figure 2:
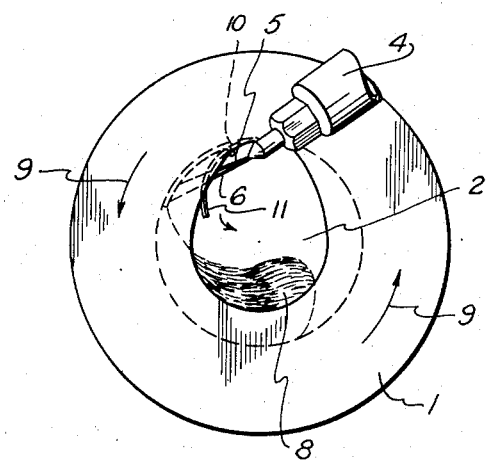
Figure 2 is a cross-sectional view on the line 2—2 of Figure 1.

As shown in Figures 1 and 2, the piston 1 having a cup-shaped combustion chamber 2 formed by the rotation of a curve operates in a cylinder 3 having a cylinder head 3a. A fuel nozzle 4 in the cylinder head has its outlet orifice eccentric to the axis of the cylinder and combustion chamber. Fuel jets 5 and 6, the number of jets being given for purposes of illustration only, are directed tangentially against combustion chamber wall 7 over a short path having a distance L. The fuel forms a thin film 8 extending over the major portion of the wall 7. Simultaneously with the fuel injection is an air swirl moving around the cylinder and the combustion chamber axis in the direction of the arrows 9, Figure 2. This air swirl is created by the entrance of the air into the cylinder over masked intake valves or the like. Thus, sufficient kinetic energy is produced for wiping off the fuel from the film in the form of fuel vapor and the mixing of the vapor with the air.

According to this invention, adjacent to fuel jets 5 and 6 and fastened to the wall 7 by a screw 10 is a bi-metal strip 11. This strip is mounted and so shaped that, when cold, the strip extends across the path of the fuel jet and toward the interior of the combustion chamber, and thus deflects the fuel jets. At operating temperatures, the strip 11 moves under thermal expansion so as to bear against wall 7, as indicated by the dashed lines in Figure 2. This frees the path of jets 5 and 6 so that the fuel strikes the wall 7. The drawing shows a relatively steep angle of contact of the jets 5 and 6 with the wall 7 for purposes of illustration. Actually, this angle can be much less, as well as the distance L much shorter.

Figure 3:
Figure 3 is a detailed view of a modified form of the invention.
Figure 4:
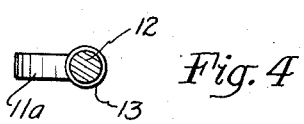
Figure 4 is a cross-sectional view on the line 4—4 of Figure 3.

In Figures 3 and 4, the bi-metal strip 11a is mounted on the end body portion 12 of injection nozzle 4. This mounting can be accomplished by means of a ring 13 from which the bi-metal strip 11a extends. The operation of strip 11a is the same as that of strip 11 in Figures 1 and 2.

The invention is not restricted to the disclosed forms. It can be used also in internal combustion engines in which the combustion chamber is formed in the cylinder head instead of the piston. Furthermore, the invention is not limited, even if preferred, to improving the cold starting of engines. The same means of jet deflection has advantages, for example, during the running of the engine. According to the operating temperatures in the combustion chamber, the baffle strip can be used to control a more or less amount of fuel reaching the combustion chamber wall or even to keep the fuel from striking the combustion chamber wall.

Furthermore, as heretofore indicated, the invention is not limited to engines operating as in German Patent No. 865,683 but is applicable to all engines in which the fuel is atomized in the air and in which it is intended to inject the fuel into hot cylinder portions during certain operating conditions.

Having now described the means by which the objects of the invention are obtained, I claim:

1. A cold starting device for a fuel injection internal combustion engine in which the major portion of the injected fuel jet is directed against the wall of the combustion chamber to form a film and the minor fuel portion is atomized, comprising a baffle mounted in said chamber in the path of the fuel jet when cold and thereby deflecting said jet and atomizing the fuel during cold starting of the engine, and being automatically movable by a rise in temperature in said chamber to a position out of the path of the fuel jet.

2. A cold starting device as in claim 1, said baffle comprising a bi-metal element.

3. A cold starting device as in claim 1, said baffle comprising a bi-metal element having one end secured to the wall of said chamber.

4. A cold starting device as in claim 1, further comprising a fuel injection nozzle, and said bi-metal element being mounted on said nozzle.

No references cited.